United States Patent
Rayter

(10) Patent No.: US 9,525,896 B2
(45) Date of Patent: Dec. 20, 2016

(54) AUTOMATIC SUMMARIZING OF MEDIA CONTENT

(71) Applicant: Ran Rayter, Ramat HaSharon (IL)

(72) Inventor: Ran Rayter, Ramat HaSharon (IL)

(73) Assignee: BERALE OF TELDAN GROUP LTD., Ramat Gan (IL)

( * ) Notice: Subject to any disclaimer, the term of this patent is extended or adjusted under 35 U.S.C. 154(b) by 186 days.

(21) Appl. No.: 14/092,962

(22) Filed: Nov. 28, 2013

(65) Prior Publication Data

US 2014/0156651 A1 Jun. 5, 2014

(30) Foreign Application Priority Data

Dec. 2, 2012 (IL) .......................................... 223381

(51) Int. Cl.
*H04N 21/235* (2011.01)
*H04N 21/8549* (2011.01)
*H04N 21/435* (2011.01)
*H04N 21/845* (2011.01)
*G06F 17/30* (2006.01)

(52) U.S. Cl.
CPC .... *H04N 21/2353* (2013.01); *G06F 17/30843* (2013.01); *H04N 21/435* (2013.01); *H04N 21/8456* (2013.01); *H04N 21/8549* (2013.01)

(58) Field of Classification Search
CPC ..................... G06F 17/30843; G06F 17/30283; G06F 17/30575; G06F 17/30156; G06F 17/30091; G06F 17/3015; G06F 17/30194; G06F 3/0641; H04N 21/8456; H04N 21/8549
See application file for complete search history.

(56) References Cited

U.S. PATENT DOCUMENTS

| | | | | |
|---|---|---|---|---|
| 5,995,941 | A * | 11/1999 | Maquire | ................ G06Q 30/02 235/52 |
| 6,029,195 | A | 2/2000 | Herz | |
| 6,557,042 | B1 * | 4/2003 | He et al. | ....................... 709/231 |
| 6,636,238 | B1 * | 10/2003 | Amir et al. | .................... 715/730 |
| 6,751,776 | B1 * | 6/2004 | Gong | ................ G06F 17/30616 707/E17.028 |
| 2002/0069218 | A1 | 6/2002 | Sull et al. | |
| 2002/0099694 | A1 | 7/2002 | Diamond et al. | |
| 2003/0236792 | A1 | 12/2003 | Mangerie et al. | |
| 2004/0255249 | A1 * | 12/2004 | Chang et al. | ................. 715/723 |
| 2006/0149781 | A1 | 7/2006 | Blankinship | |
| 2006/0153535 | A1 | 7/2006 | Chun et al. | |
| 2007/0027844 | A1 | 2/2007 | Toub et al. | |
| 2007/0106660 | A1 * | 5/2007 | Stern et al. | ....................... 707/5 |
| 2007/0292106 | A1 | 12/2007 | Finkelstein et al. | |
| 2009/0172714 | A1 | 7/2009 | Gruia et al. | |

(Continued)

*Primary Examiner* — James E Richardson
(74) *Attorney, Agent, or Firm* — Mark M. Friedman

(57) ABSTRACT

The subject matter discloses an automatic summarizing method the method comprising: receiving from a computerized device a request for summarizing a media content; segmenting the media content into a plurality of segments; wherein an at least one of the plurality of segments is associated with a metadata; wherein said metadata comprising characteristics; ranking a relevancy of each of the plurality of segments; wherein the ranking comprising associating scores to the segments according to the metadata; and selecting an at least one selected segment from said plurality of segments; wherein the at least one selected segment is associated with a highest score from the scores.

5 Claims, 3 Drawing Sheets

(56) References Cited

U.S. PATENT DOCUMENTS

| | | | |
|---|---|---|---|
| 2011/0010628 A1 | 1/2011 | Segal et al. | |
| 2011/0196862 A1* | 8/2011 | Bergman | G06F 17/30056 707/728 |
| 2012/0106925 A1* | 5/2012 | Dirik | H04N 5/147 386/240 |
| 2012/0323897 A1* | 12/2012 | Daher et al. | 707/723 |
| 2013/0013583 A1* | 1/2013 | Yu | G06F 17/3084 707/709 |

* cited by examiner

AUTOMATIC SUMMARIZING OF MEDIA CONTENT

FIELD OF THE INVENTION

The present disclosure relates to media content in general, and to lecture capturing, in particular.

BACKGROUND OF THE INVENTION

Capturing media content refers to the process of digitally capturing and archiving the data of a lecture, a conference, seminar and the like.

Capturing media content consists of hardware and software components that work in synergy to record audio and visual components of the record. Examples of such components are a camera for capturing a video of the lecturer, screen capture and a screen capture unit for capturing the content of the screen during the lecture.

The data of the lecture is provided to the students typically via the internet for enabling the user to watch the lecture at any time.

SUMMARY OF THE INVENTION

One exemplary embodiment of the disclosed subject matter is an automatic summarizing method; the method comprising: receiving from a computerized device a request for summarizing a media content; segmenting the media content into a plurality of segments; wherein an at least one of the plurality of segments being associated with a metadata; wherein the metadata comprising characteristics; ranking a relevancy of each of the plurality of segments; wherein the ranking comprising associating scores to the segments according to the metadata; and selecting an at least one selected segment from the plurality of segments; wherein the at least one selected segment being associated with a highest score from the scores. According to some embodiments the at least one characteristic of the at least one segment comprising a reference of an at least one user. According to some embodiments the at least one characteristic comprising characteristic of the media content. According to some embodiments the reference from the at least one user further comprises a feedback. According to some embodiments the characteristic comprises a rating associated with the segment. According to some embodiments the method further comprising analyzing a behavior of an at least one user for providing the reference from the at least one user. According to some embodiments the request further comprising a parameter of a key word and; wherein the associating the score further comprising calculating a proximity of the key word to words in an at least one segment of the plurality of segments. According to some embodiments the method further comprising translating the media content into a textual document prior to the associating the score. According to some embodiments the calculating further comprising morphology testing. According to some embodiments the segmenting being according to time. According to some embodiments; wherein the method further comprising combining an at least one selected segment from the plurality of segments into a combined segment; wherein the score associated with the at least one selected segments being higher from or at least equal to the score associated with segments from the plurality of segments not being in the combined segment; wherein a combined length of the combined segment being substantially equal to the requested length. According to some embodiments the segmenting being according to content.

One exemplary embodiment of the disclosed subject matter is an automatic summarizing method; the method comprising: receiving from a computerized device a request for summarizing a media content; segmenting the media content into a plurality of segments; wherein the plurality of segments being associated with a metadata; wherein the metadata comprising an at least one reference from an at least one user; ranking a relevancy of each of the plurality of segments; wherein the ranking comprising associating scores to the segments according to the metadata; and selecting an at least one selected segment from the plurality of segments; wherein the at least one selected segment being associated with a highest score from the scores. According to some embodiments the reference from the at least one user further comprises a feedback. The method of claim 14; wherein the characteristic comprises a rating associated with the segment. According to some embodiments the method further comprising analyzing a behavior of an at least one user for providing the reference from the at least one user. According to some embodiments, the request further comprising a parameter of a key word and; wherein the associating the score further comprising calculating a proximity of the key word to words in ant at least one segment of the plurality of segments. According to some embodiments the method further comprising translating the media content into a textual document prior to the associating the score. According to some embodiments the calculating further comprising morphology testing. According to some embodiments the segmenting is according to time. According to some embodiments, the segmenting is according to content.

One exemplary embodiment of the disclosed subject matter is an automatic summarizing method; the method comprising: receiving from a computerized device a request for summarizing a media content; wherein the request comprising a parameter of a key word; segmenting the media content into a plurality of segments; wherein the plurality of segments being associated with a metadata; wherein the metadata comprising an at least one reference from an at least one user; ranking a relevancy of each of the plurality of segments; wherein the ranking comprising associating scores to an at least one of the segments according to the metadata; wherein the ranking further comprising calculating proximity of the key word to words in the at least one segment; and selecting an at least one selected segment from the plurality of segments; wherein the at least one selected segment being associated with a highest score from the scores. According to some embodiments the reference from the at least one user further comprises a feedback. According to some embodiments the characteristic further comprises a rating associated with the segment. According to some embodiments the method further comprising analyzing a behavior of an at least one user for providing the reference from the at least one user. According to some embodiments the method, further comprising translating the media content into a textual document prior to the associating the score., wherein the calculating further comprising morphology testing. According to some embodiments the segmenting being according to time. According to some embodiments the segmenting being according to content.

One exemplary embodiment of the disclosed subject matter is an automatic summarizing method; the method comprising receiving from a computerized device a request for summarizing a media content into a summarized media content; wherein the request comprising a parameter of a requested length of the summarized media content; segmenting a media content into a plurality of segments; ranking a relevancy of each of the plurality of segments; wherein the ranking comprising associating a score to an at least one of the segments; and combining an at least one selected segment from the plurality of segments into a combined segment; wherein the score associated with the at least one selected segments being higher from or at least equal to the score associated with segments from the plurality of segments not being in the combined segment; wherein a combined length of the combined segment being substantially equal to the requested length. According to some embodiments, the method further comprising ordering the at least one segments in the combined segment according to chronological order. According to some embodiments, the method further comprising ordering the at least one segments in the combined segment according to the score associated with the at least one segments. According to some embodiments, the method further comprising ordering the at least one segments in the combined segment according to chronological order and according to the score associated with the at least one segments.

One exemplary embodiment of the disclosed subject matter is an automatic summarizing apparatus; the apparatus comprising: a transmitting unit configured for receiving from a computerized device a request for summarizing a media content; and a processor configured for segmenting the media content into a plurality of segments; wherein an at least one of the plurality of segments being associated with a metadata; wherein the metadata comprising characteristics; for ranking a relevancy of each of the plurality of segments; wherein the ranking comprising associating scores to the segments according to the metadata; and for selecting an at least one selected segment from the plurality of segments; wherein the at least one selected segment being associated with a highest score from the scores. According to some embodiments the at least one characteristic of the at least one segment comprising a reference of an at least one user.

One exemplary embodiment of the disclosed subject matter is an automatic summarizing apparatus; the apparatus comprising a transmitting unit configured for receiving from a computerized device a request for summarizing a media content into a summarized media content; wherein the request comprising a parameter of a requested length of the summarized media content; and a processor configured for segmenting a media content into a plurality of segments; for ranking a relevancy of each of the plurality of segments; wherein the ranking comprising associating a score to an at least one of the segments; and for combining an at least one selected segment from the plurality of segments into a combined segment; wherein the score associated with the at least one selected segments being higher from or at least equal to the score associated with segments from the plurality of segments not being in the combined segment; wherein a combined length of the combined segment being substantially equal to the requested length. According to some embodiments the processor is further configured for ordering the at least one segments in the combined segment according to chronological order. According to some embodiments wherein the processor is further configured for ordering the at least one segments in the combined segment according to the score associated with the at least one segments. According to some embodiments wherein the processor is further configured for ordering the at least one segments in the combined segment according to chronological order and according to the score associated with the at least one segments.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The term "media content" refers herein to data that can be stored in any computer readable medium. Such media content includes text, documents, video, audio, animation, icons, graphics, images and the like or any combination thereof.

The term "rating" refers herein to percentage or quantity of the audience who plays media content or a segment from media content.

The term "reference" refers herein to input inserted by a user or a plurality of users which is related to one or more segments of the media content. The input includes textual input, predefined tags, comments of a user to a reference of another user, bookmarks and statistics of references. The term reference refers also to an analysis of a behavior of an audience of content. An example is an analysis of the number of students who bend down in order to write a comment and to refer to the lecture. The analysis can be done by analyzing the video that captures the students.

The term "key word" refers to a word or a phrase and a combination thereof.

Embodiments of the invention disclose a tool for automatic summarizing media content for providing a summary of the media content according to characteristics.

One technical problem dealt with by the present disclosure is providing an automatic summary of media content. For example a student would like to obtain an automatic summary of one or more videos and one or more presentations documents according to characteristics requested by the user.

One technical solution is to segment the media content into a plurality of segments and to automatically select and combine the relevant segments according to the characteristics.

Figure 1:
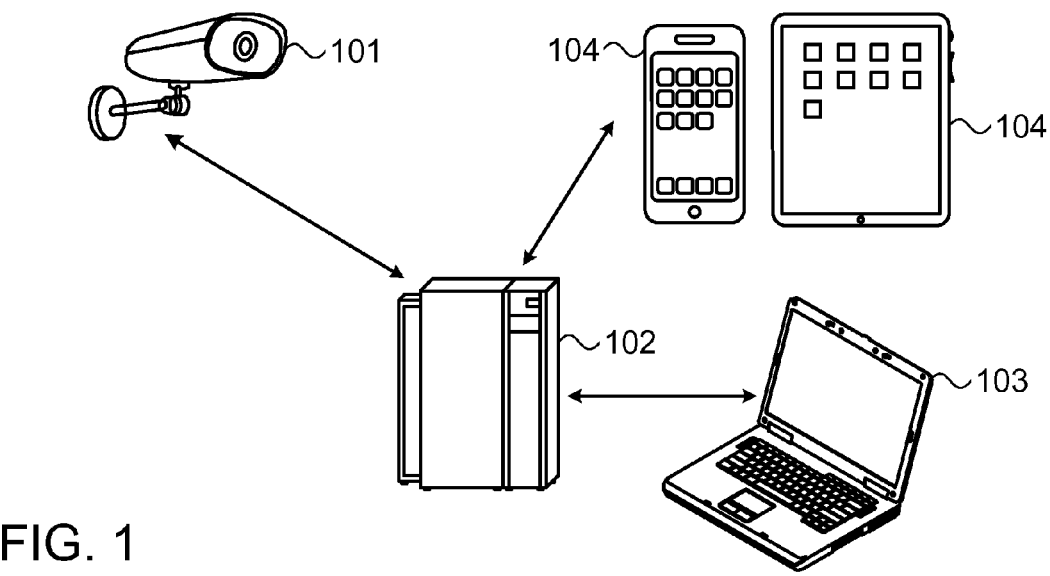
FIG. 1 shows a block diagram of an exemplary system for automatic summarizing media content, in accordance with some exemplary embodiments of the disclosed subject matter.

FIG. 1 shows a block diagram of an exemplary system for automatic summarizing media content, in accordance with some exemplary embodiments of the disclosed subject matter.

System 100 includes an at least one video camera 101, a centralized computerized device 102, a lecturer computerized device 103 and a plurality of users computerized devices 104.

The video camera 101 is configured for capturing a video from a scene. An example of such a scene is a lecture; another example is a tutoring scene. An example of such a tutoring scene is a scenario for producing furniture in which an expert explains and shows how to produce the furniture. The video camera captures the scene. The video camera may also capture the environment of the scene. For example in the case of a lecture, the video camera may capture the lecturer, the screen and the audience. In some embodiments the video of the audience is analyzed for providing rating of the lecture. The video camera 101 is connected with the centralized computerized device 102 through a network. In some embodiment the connection is via the internet network. The video is sent to the centralized computerized device 102 for being analyzed by the centralized computerized device 102.

The lecturer computerized device 103 is configured for playing multimedia content related to the lecture. Examples of such multimedia content are a presentation that includes slides, a textual document, a video film or an image. In some embodiments, the lecturer computerized device 103 is also configured for capturing the multimedia content that is displayed on the screen of the lecturer computerized device 103. The lecturer computerized device 103 is connected with the centralized computerized device 102 for transferring the screen captures and/or any other digital content that is played by the lecturer computerized device 103 during the scene. The lecturer computerized device 103 is connected with the centralized computerized device 102 through a network. In some embodiment the connection is via the internet network. Examples of lecturer computerized device 103 are a laptop, a personal computer and a TABLET.

The plurality of users computerized device 104, are configured for enabling the user to provide a reference on the content of the scene while the content is being generated or played. For example, a user can provide a reference of a lecture, while the lecture is being played on his computer or while he is watching the lecturer. Each of the plurality of user's computerized device 104 is also configured for enabling a user to communicate with other users, by for example chatting with the other users during the lecture. Each of the plurality of user's computerized device 104 is also configured for interfacing with social networks during the scene (for example, during the lecture) or while playing the digital content that is related to the scene. In some embodiments the interfacing with the social networks is for providing a reference on the content. The plurality of user's computerized device 104 is connected with the centralized computerized device 102 through a network. In some embodiment the connection is via the internet network. Examples of A computerized device 104 are a laptop, a Smartphone, a personal computer a TABLET.

The centralized computerized device 102 is configured for receiving the reference from the plurality of computerized devices 104, for generating a metadata, for associating the metadata with a multimedia content, for receiving the videos from the camera 101 and for analyzing the multimedia content according to characteristics and for returning to a user a summary of the multimedia content. In some embodiments the centralized computerized device 102 is a server.

Figure 2:
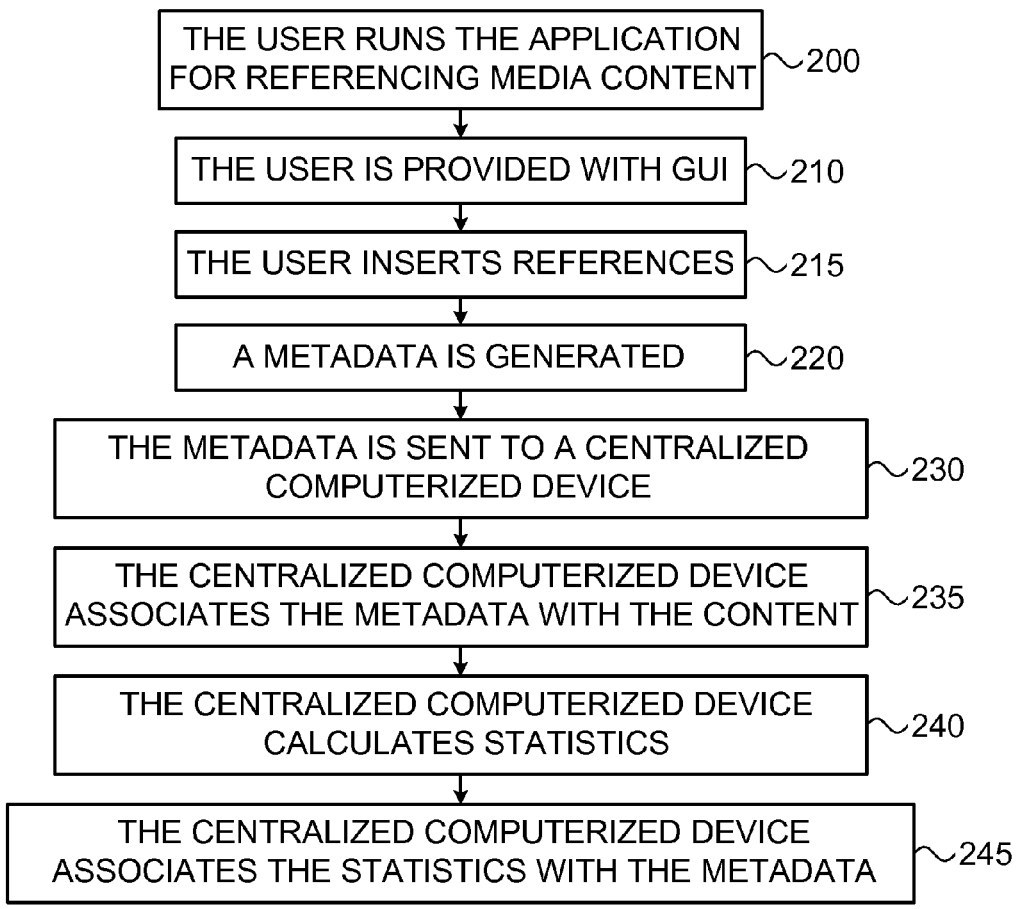
FIG. 2 shows a flowchart diagram of an embodiment of a method for automatic summarizing, in accordance with some exemplary embodiments of the disclosed subject matter.

FIG. 2 shows a flowchart diagram of an embodiment of a method for automatic summarizing, in accordance with some exemplary embodiments of the disclosed subject matter. According to some embodiment, a user can provide a reference the scene during the scene or while playing the scene on his computerized device. For example, the user may reference a lecture while being in the lecture or while playing the lecture. The user may also communicate with other users, by for example chatting with the other users during the lectures. In some embodiments the communication is via social networks.

At 200, the user runs the application for referencing media content.

At 210 the user is provided with a graphical user interface (GUI) that enables the user to refer to the content of the scene. For example when the user listens to a lecturer, the user can insert reference related to the content. In some embodiments the reference includes free text, in some other embodiments, the reference includes predefined tags. Examples of such predefined tags are: important, not important, new topic, not relevant and the like.

At 215 the user tags the content with the reference.

At 220 a metadata is generated. In some embodiments the metadata includes the reference, the identification of the user and the time of generating the reference. In some embodiment the time is associated with the start time of the scene.

At 230, the metadata is sent from the computerized device of the user to the centralized computerized device.

At 235, the centralized computerized device associates the metadata with the content.

At 240, the centralized computerized device calculates statistics. In some embodiments the statistic includes the rate of users that select the reference for this segment. For example 70% is associated to a reference of not important associated with a segment if 70% of the users associate the reference not important with this segment. Statistics may also be calculated from the chats that are performed through a social network, and from analyzing of the behavior of the audience during the lecture.

Figure 3:
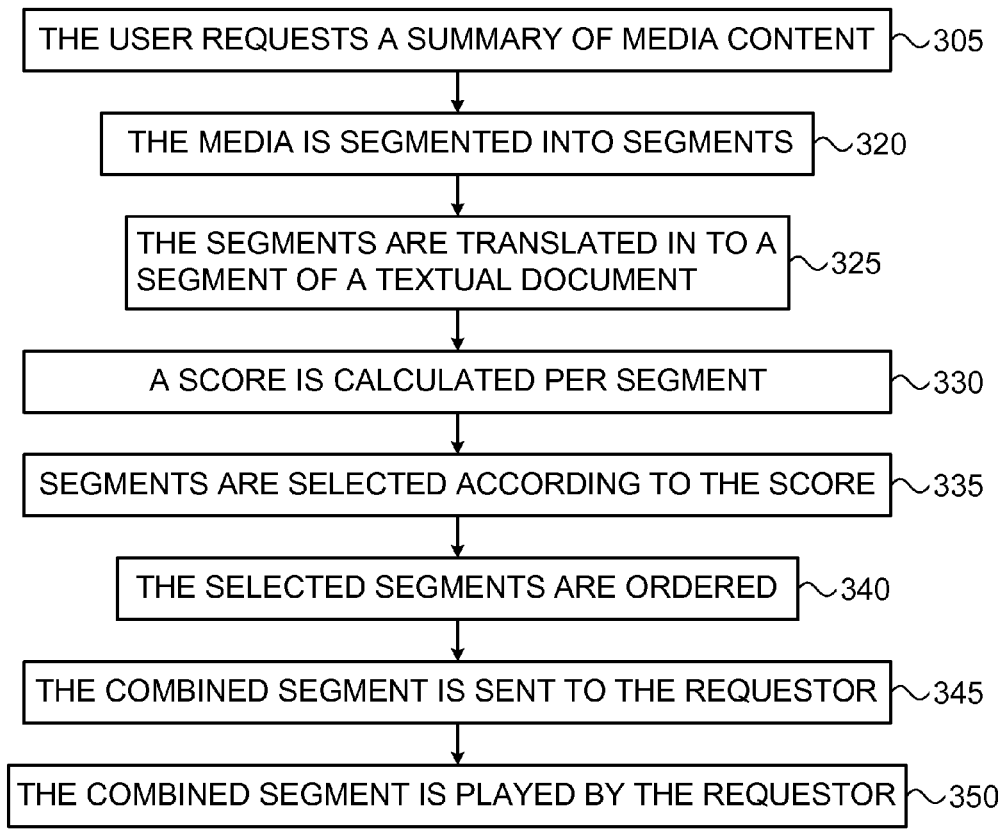
FIG. 3 shows a flowchart diagram of one other embodiment of a method for automatic summarizing, in accordance with some exemplary embodiments of the disclosed subject matter.

At 245, the centralized computerized device associates the statistics with the metadata FIG. 3 shows a flowchart diagram one other embodiment for automatic summarizing, in accordance with some exemplary embodiments of the disclosed subject matter. According to some embodiments, a summary of the content is provided to the user. The summary includes segments of the content. The segments of the content are selected according to one or more criteria. Examples of such criteria are similarity to key words, reference to the content provided by the user that requests the summary, reference to the content provided by other users, rating, criteria related to technical analysis of the content, such as the quality of the sound, and an automatic analyzes of the behavior of the audience during the lecture.

At 305, the user requests to receive a summary of media content. In some embodiments, the user requests a summary according to a key word, in some embodiments the user requests a summary according to one or more other criteria or additional one or more criteria. For example, the user requests to receive a summary of all the most difficult sections of the lectures in the course "introduction to philosophy" which refer to Socrates. The media content of the course includes a slide presentation and a video. The user issues a request to the system with the key work "Socrates" and with the reference difficult. In some embodiments the user limits the length of the summary by entering a parameter of requested length. In some embodiments, the length of the summary is limited according to a pre defined parameter.

At 320 the media is segmented into segments. In some embodiments the length of the segments is predefined. The length of the segment can be related to time, to number of words, to number of sections in the document and the like. For example, a content of a video can be segmented into 5 minutes segments. In some cases the length of the segment is also defined by a content of the segment.

The metadata that includes criteria of the content is associated with the relevant segment. For example, an analyze of a behavior of the audience during the first five minutes and comments of users to the content of the first 5 minutes of a lecture are associated with the first segment.

At 325 which may be performed if the media content is not a textual document, the segments may be translated in to a segment of a textual document. For example, if the media content is a video, each segment of the video may be translated into a paragraph in a text document by using voice to text techniques. In another example Optical Character Reader (OCR) technique is used for translating a screen capture or capture of a board or a handwriting.

At 330, a score is calculated per each segment for ranking the relevancy of the segment to the user. The calculated score is associated with the segment. The score may be calculated from the metadata that is associated with the segment. The score may be also calculated from the proximity of the key words to words in the segment or by a combination thereof. The calculation of the score according to metadata is performed by assigning a weight and a score to each metadata element. Each metadata element includes a criterion for scoring. The calculation of the score according to proximity of key words may be done by using morphology. In one example a segment of the multimedia content that includes a slide with two headers is scored. The higher level heather is assigned with a weight of 30% while the lower level header is assigned with the weight 15%. The score of each header is calculated according to similarity of words to the key words.

At 335, segments are selected according to the score. The selected segments are combined into a combined segment. The score of the selected segments is higher from or, at least, equal to score of the other segments that have not been selected. The combined length of the combined segment is substantially equal to the requested length or to a predefined length. In one example a user requests a 10 minutes summary of a plurality of videos with a total length of two hours. The videos are segmented into substantially two minutes segments. The segments are ranked. Five segments having a score that is greater from or equal to scores of all the other segments are selected and are combined into a ten minutes video. Additional criteria such as selecting sequential segments may also be taken into consideration.

At 340, the selected segments are ordered. According to some embodiments the order is a chronological order, according to the score or a combination thereof.

At 345, the combined segment is sent to the requestor.

At 350 the combined segment is played by the requestor.

Figure 4:
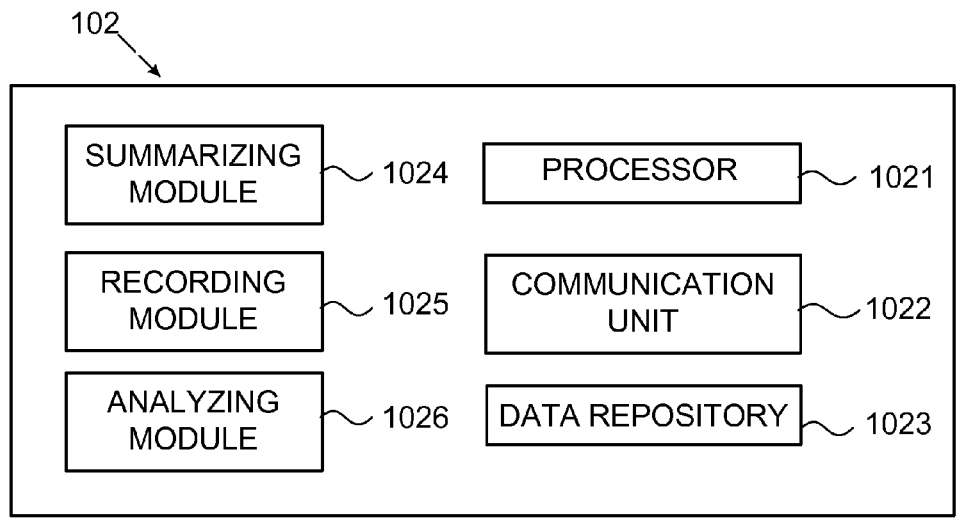
FIG. 4 shows a block diagram of an exemplary computerized device for automatic summarizing, in accordance with some exemplary embodiments of the disclosed subject.

FIG. 4 shows a block diagram of an exemplary computerized device for automatic summarizing, in accordance with some exemplary embodiments of the disclosed subject matter.

Computerized device 102 includes a processor 1021 a communication unit 1022, a data repository 1023, a summarizing module 1024, a recording module 1025 and an analyzing module 1026

The communication unit 1022 is configured for receiving from a computerized device a request for summarizing media content and for transmitting the summary to the computerized device.

The summarizing module 1024 is configured for segmenting the media content into segments; for associating the segments with a metadata; for associating scores segments according to the metadata and according to proximity of the key word to words to the segments and for selecting the segment that is associated with a highest score. The summarizing module 1024 is further configured for combining selected segments into a combined segment such that a score associated the selected segments is higher from or at least equal to the score associated with segments from the plurality of segments which are not included in that combined segment. The combined length the combined segment is substantially equal to the requested length.

The analyzing module 1026 is configured for analyzing the media content, for analyzing the input from the users and for analyzing the behavior of the users.

The recording module 1025 is configured for recording the multimedia content.

The communication unit 1022 is further configured for receiving from a computerized device a request for summarizing media content. According to some embodiments the request includes a parameter of a requested length of the summary.

The data repository 1023 is configured for storing data for performing statistics related to characteristic of segments of the multimedia content.

Figure 5:
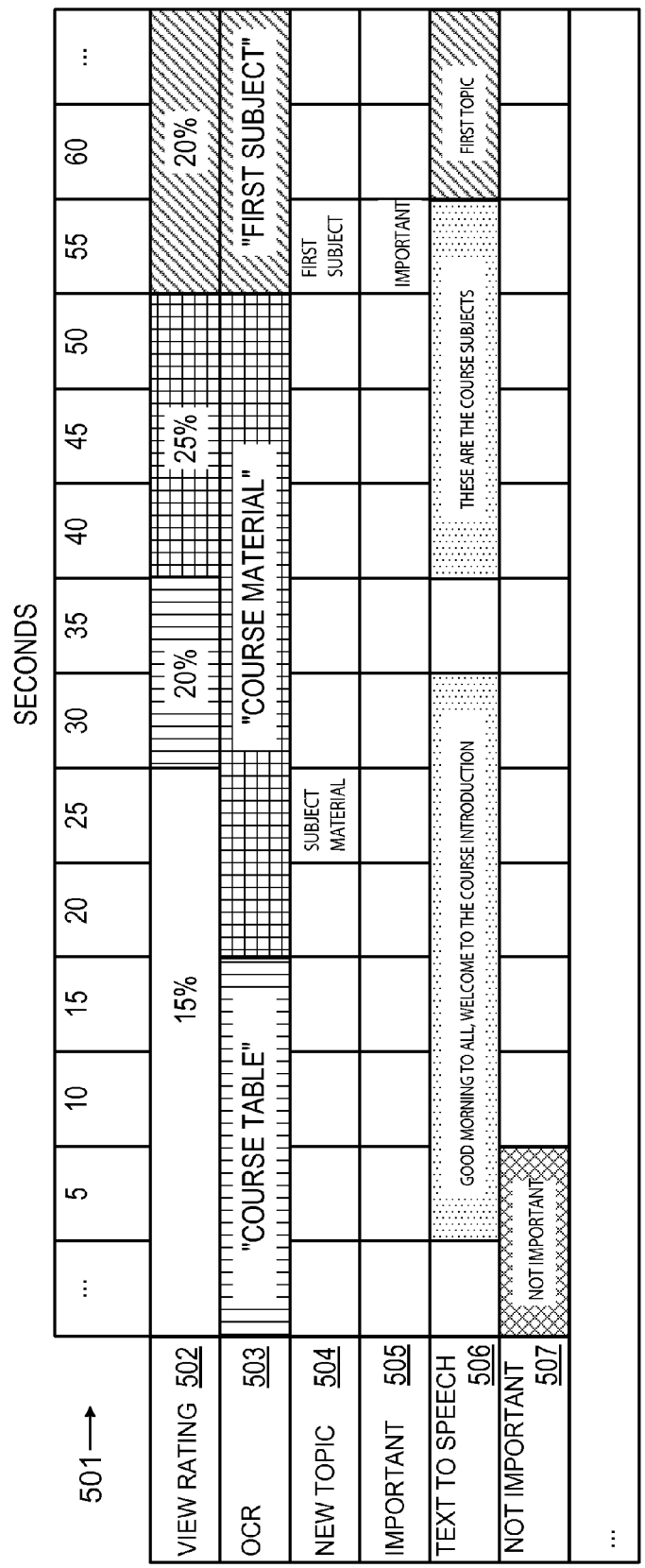
FIG. 5 shows a block diagram of exemplary segments of media content with metadata, in accordance with some exemplary embodiments of the disclosed subject.

FIG. 5 shows a block diagram of exemplary segments of media content with metadata, in accordance with some exemplary embodiments of the disclosed subject matter.

Five minutes segments 501 include rating characteristic 502, OCR textual content 503, new topic characteristic 504, importance characteristic 505, a textual presentation of a video 506 and not important characteristic 507.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or segment of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like. Computer program code for carrying out operations of the present invention may be written in any combination of one or more programming languages, including an entity oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or debriefing computerised device. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method; the method comprising:
    capturing media content by a video camera during a lecture or a tutoring scene;
    segmenting said media content into a plurality of segments;
    receiving from a computing device a request for summarizing said media content; wherein said media content comprises a video file or an audio file;
    capturing a screen capture by a lecturer computing device during said lecture or said tutoring scene;
    analyzing metadata from said screen capture;
    associating an at least one of said plurality of segments with said metadata;
    associating scores to said segments according to said metadata; to, thereby determining relevancy of said segments to a user of said computing device in accordance with said screen capture; and
    selecting, from said plurality of segments, an at least one selected segment associated with a highest score from said scores.

2. The method of claim 1, wherein said request comprises a key word, wherein said metadata comprising output of Optical Character Reader of said screen capture and wherein said associating said score is in accordance with weight of sections of text in said output and in accordance with with similarity to said key word in said sections of text.

3. The method of claim 1, wherein said screen capture comprises a slide and wherein said associating said score further comprising associating higher weight to words in a header of said slide.

4. The method of claim 1, wherein said segmenting is according to content or according to chronological order.

5. A system; the system comprising:
    a camera configured for capturing media content during a lecture or a tutoring scene;
    a communication unit configured for receiving from a computerized device a request for summarizing said media content;
    a lecturer computing device configured for capturing a screen capture of said lecture or said tutoring scene during said lecture or said tutoring scene; and
    a processor configured for segmenting said media content into a plurality of segments, for analyzing metadata from said screen capture, for associating an at least one of said plurality of segments with said metadata; wherein said processor further configured for ranking a relevancy of each of said plurality of segments; wherein said ranking comprising associating scores to said segments according to said metadata; wherein said processor further configured for selecting an at least one selected segment associated with a highest score from said scores to, thereby determining relevancy of said segments in accordance with said screen capture.

\* \* \* \* \*